United States Patent
Yang et al.

(10) Patent No.: US 9,886,418 B2
(45) Date of Patent: Feb. 6, 2018

(54) MATRIX OPERANDS FOR LINEAR ALGEBRA OPERATIONS

(71) Applicant: Intel Corporation, Santa Clara, CA (US)

(72) Inventors: Andrew Yang, Cupertino, CA (US); Carey Kloss, Los Altos, CA (US); Prashant Arora, Fremont, CA (US); Tony Werner, Los Altos, CA (US); Naveen Gandham Rao, San Diego, CA (US); Amir Khosrowshahi, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 276 days.

(21) Appl. No.: 14/697,728

(22) Filed: Apr. 28, 2015

(65) Prior Publication Data

US 2017/0060811 A1   Mar. 2, 2017

(51) Int. Cl.
| | | |
|---|---|---|
| *G06F 12/00* | (2006.01) | |
| *G06F 17/16* | (2006.01) | |
| *G06F 12/02* | (2006.01) | |
| *G06N 3/08* | (2006.01) | |

(52) U.S. Cl.
CPC ............ *G06F 17/16* (2013.01); *G06F 12/023* (2013.01); *G06N 3/08* (2013.01); *G06F 2212/251* (2013.01)

(58) Field of Classification Search
None
See application file for complete search history.

(56) References Cited

U.S. PATENT DOCUMENTS

| | | | | |
|---|---|---|---|---|
| 5,958,043 | A * | 9/1999 | Motomura | G06F 9/3838 712/216 |
| 6,615,340 | B1 * | 9/2003 | Wilmot, II | G06F 9/3004 712/209 |
| 6,745,384 | B1 * | 6/2004 | Biggerstaff | G06F 8/4441 712/203 |
| 7,617,439 | B2 * | 11/2009 | Shen | H03M 13/1148 714/752 |
| 2006/0101245 | A1 * | 5/2006 | Nair | G06F 9/30014 712/221 |
| 2006/0161612 | A1 * | 7/2006 | Gustavson | G06F 17/16 708/495 |
| 2010/0088739 | A1 * | 4/2010 | Hall | G06F 12/1483 726/1 |
| 2013/0073920 | A1 * | 3/2013 | Nie | H03M 13/27 714/752 |
| 2014/0372825 | A1 * | 12/2014 | Jeong | H03M 13/1165 714/752 |
| 2015/0301887 | A1 * | 10/2015 | Zhang | H03M 13/1102 714/764 |
| 2015/0378734 | A1 * | 12/2015 | Hansen | G06F 12/0875 712/226 |

* cited by examiner

*Primary Examiner* — John A Lane
(74) *Attorney, Agent, or Firm* — Alliance IP, LLC

(57) ABSTRACT

Described herein are methods, systems, and apparatuses to utilize a matrix operation by accessing each of the operation's matrix operands via a respective single memory handle. This use of a single memory handle for each matrix operand eliminates significant overhead in memory allocation, data tracking, and subroutine complexity present in prior art solutions. The result of the matrix operation can also be accessible via a single memory handle identifying the matrix elements of the result.

25 Claims, 11 Drawing Sheets

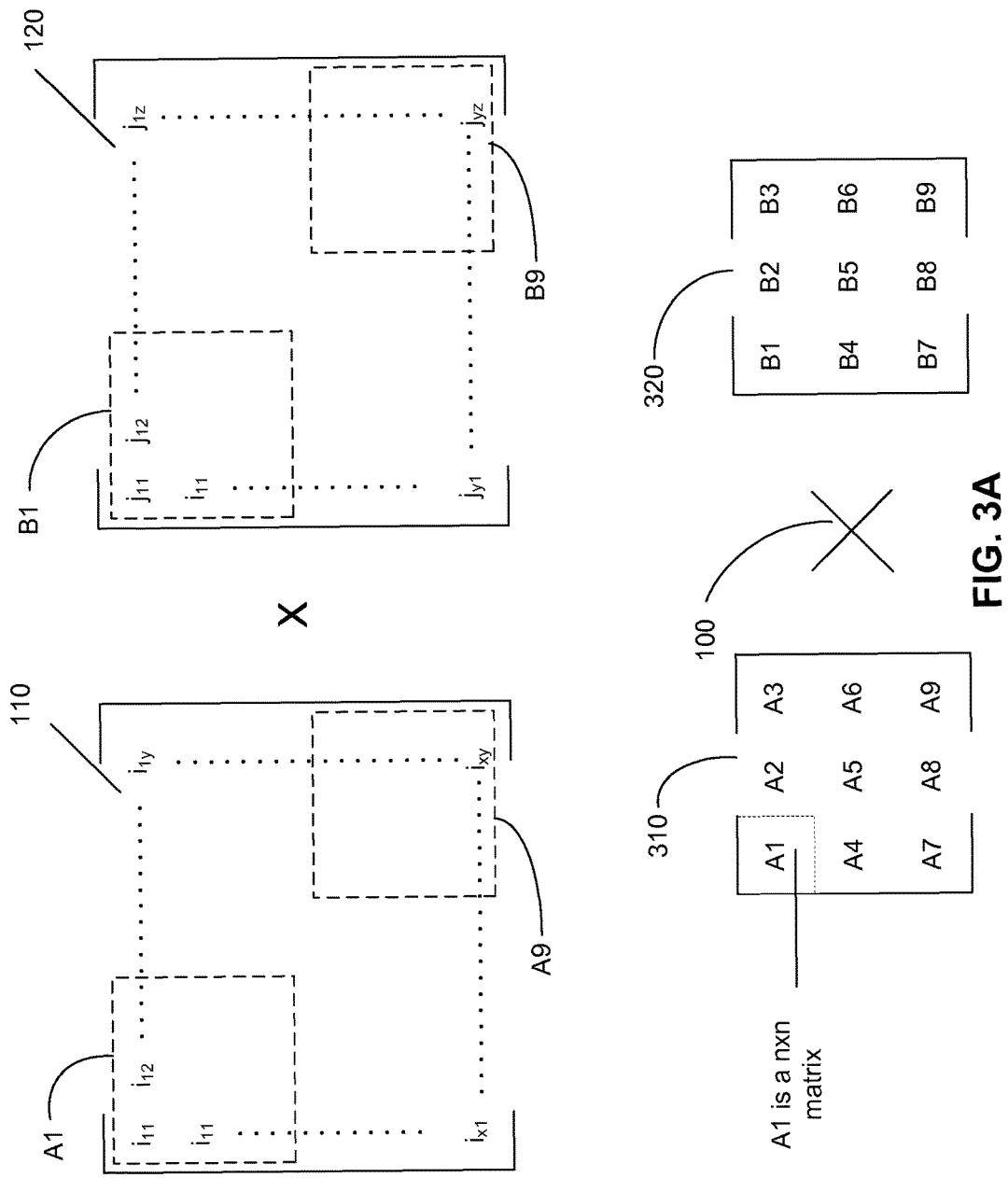

330

C1 is a nxm matrix

| C1<br>(A1*B1 + A2*B4 +A3*B7) | C2<br>(A1*B2 + A2*B5 +A3*B8) | C3<br>(A1*B3 + A2*B6 +A3*B9) |
|---|---|---|
| C4<br>(A4*B1 + A5*B4 +A6*B7) | C5<br>(A4*B2 + A5*B5 +A6*B8) | C6<br>(A4*B3 + A5*B6 +A6*B9) |
| C7<br>(A7*B1 + A8*B4 +A9*B7) | C8<br>(A7*B2 + A8*B5 +A9*B8) | C8<br>(A7*B3 + A8*B6 +A9*B9) |

MATRIX OPERANDS FOR LINEAR ALGEBRA OPERATIONS

FIELD

Embodiments generally pertain to computer processor operations and more particularly to linear algebra operations executed via one or more processing units.

BACKGROUND

Linear algebra operations are typically computation and memory intensive operations involving potentially large, multi-dimensional matrix operands. Systems are typically designed for low arithmetic intensity operations (i.e., the ratio of arithmetic operations to memory operations), and thus are not designed for efficient execution of linear algebra operations. Furthermore, system processors typically utilize complex local memory (i.e., cache) management routines for operations involving large matrix operands, thereby increasing processing overhead and execution complexity.

BRIEF DESCRIPTION OF THE DRAWINGS

The following description includes discussions of figures having illustrations given by way of example of implementations and embodiments of the subject matter disclosed herein. The drawings should be understood by way of example, and not by way of limitation. As used herein, references to one or more "embodiments" are to be understood as describing a particular feature, structure, or characteristic included in at least one implementation of the disclosure. Thus, phrases such as "in one embodiment" or "in an alternate embodiment" appearing herein describe various embodiments and implementations of the disclosure, and do not necessarily all refer to the same embodiment. However, such phrases are also not necessarily mutually exclusive.

FIG. 3A illustrates partitioning matrix operand elements to a plurality of sub-matrices according to an embodiment of the disclosure.

FIG. 3B is an illustration of a representation of the result of a matrix operation 100 according to an embodiment of the disclosure.

Descriptions of certain details and implementations follow, including a description of the figures, which can depict some or all of the embodiments described below, as well as a description of other potential embodiments or implementations of the concepts presented herein. An overview of embodiments is provided below, followed by a more detailed description with reference to the drawings.

DESCRIPTION

Embodiments of the disclosure describe methods, apparatuses, and systems utilizing matrix operands for linear algebra operations. Throughout this specification, several terms of art are used. These terms are to take on their ordinary meaning in the art from which they come, unless specifically defined herein or unless the context of their use would clearly suggest otherwise. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects of the disclosure.

Figure 1:
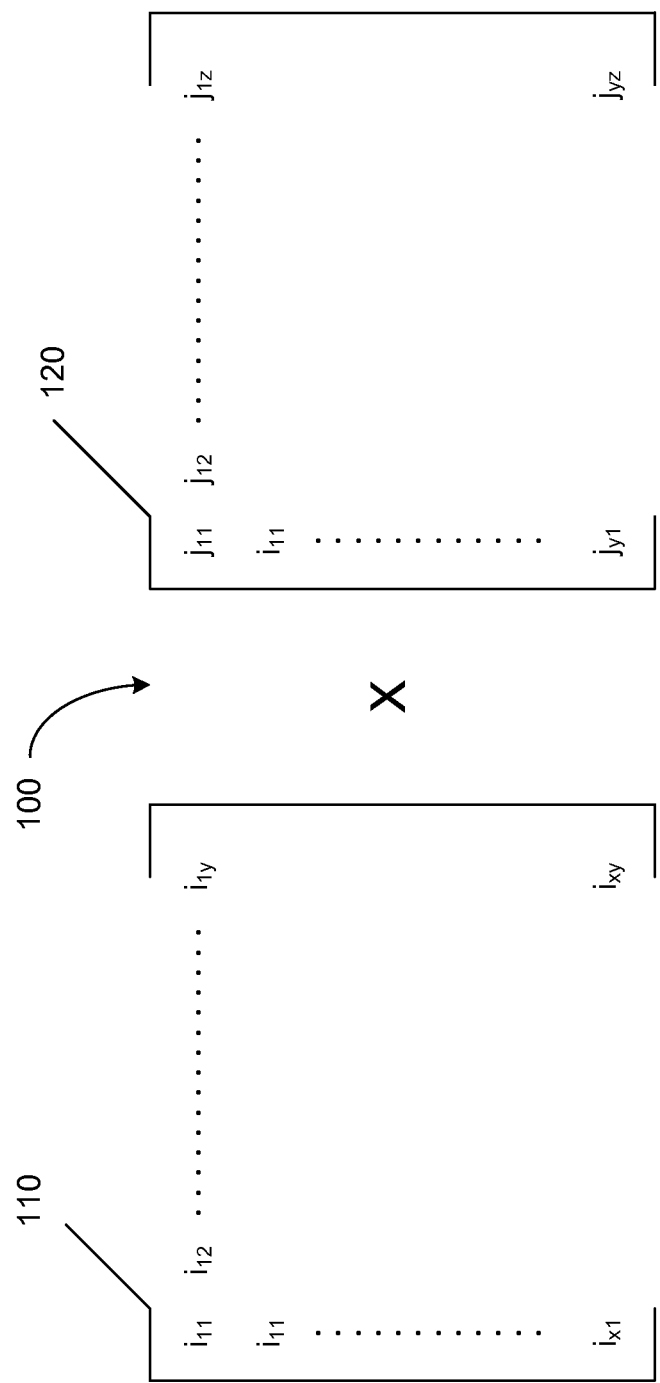
FIG. 1 is an illustration of a linear algebra instruction to be executed via one or more processing units according to an embodiment of the disclosure.

FIG. 1 is an illustration of a linear algebra instruction to be executed via one or more processing units according to an embodiment of the disclosure. In this embodiment, a linear algebra instruction is shown as a matrix operation 100 multiplying two matrix operand—the operands 110 and 120. The matrix operands 110 and 120 are each shown to comprise at least a plurality of multi-dimensional matrix operands (the operands 110 and 120 are illustrated as two-dimensional (2D) operands for exemplary purposes only; for example, embodiments can use three or more dimensional matrix operands (i.e., n-dimensional operands), etc.). The matrix operand 110 is shown to comprise a set of matrix elements $i_{11}$-$i_{yx}$ arranged in row and column directions (i.e., 'y' rows and 'x' columns). The matrix operand 120 is shown to comprise a set of matrix elements $j_{11}$-$j_{xy}$ arranged in row and column directions (i.e., 'x' rows and 'y' columns). These matrix elements can comprise numbers, or other mathematical objects. The result of the matrix operation 100 is a multi-dimensional matrix having 'y' rows and 'y' columns.

Linear algebra instructions are frequently executed for machine learning processes and networks (e.g., Bayesian networks, neural networks, etc.). Processors (alternatively referred to herein as "processing units") such as central processing units (CPUs) and graphics processing units (GPUs) can be designed to execute certain mathematic operations more effectively (e.g., GPUs can have a large number of Arithmetic Logic Units (ALUs)). Low-level subroutines (e.g., Basic Linear Algebra Subprograms (BLAS)) can also be performed to execute common linear algebra operations efficiently on specific CPU/GPU designs; however, these solutions are not efficient when the values 'x' and 'y' are relatively large (e.g., 10,000 or higher), and these solutions still do not execute linear algebra operations as efficiently as possible.

Figure 2A:
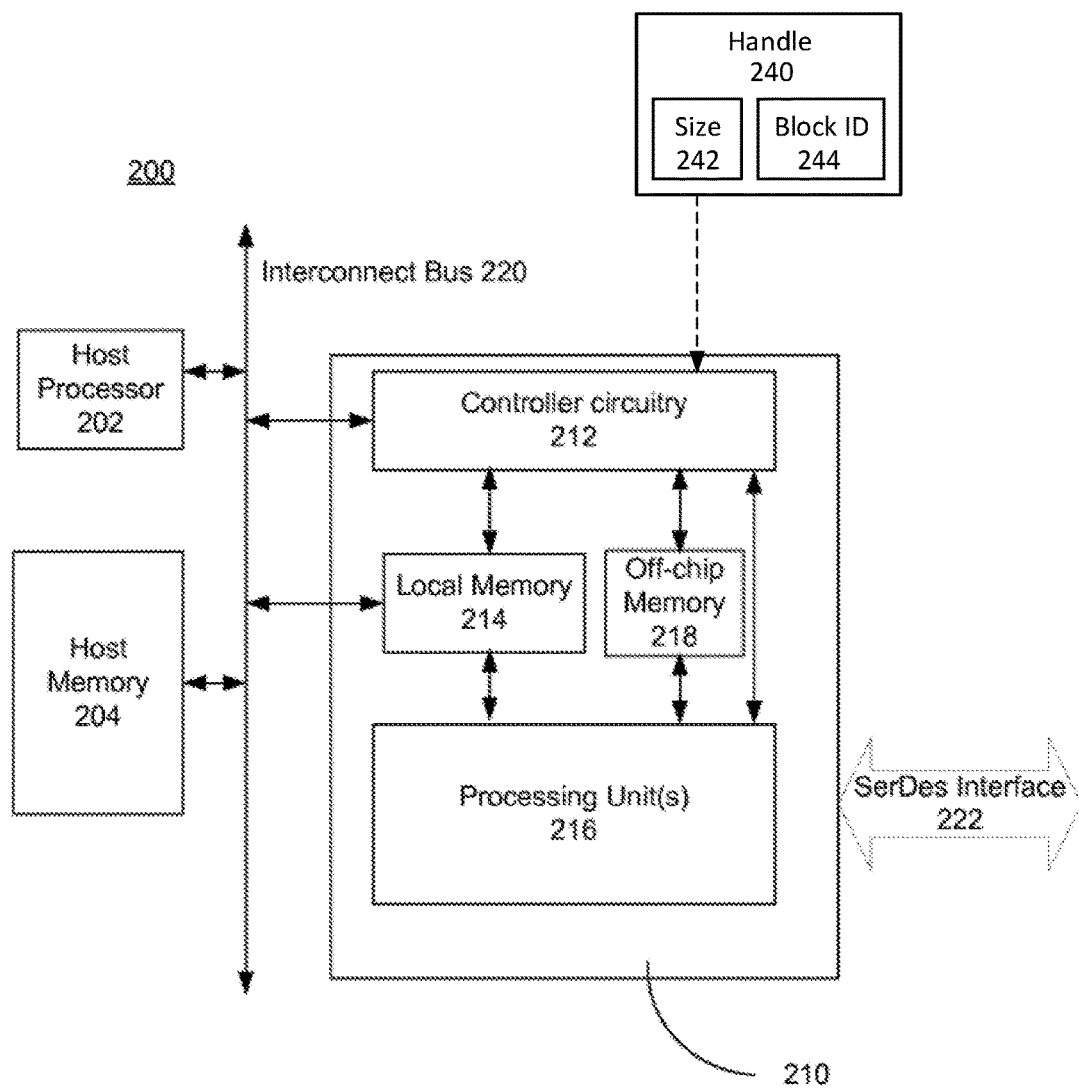
FIG. 2A-FIG. 2C are block diagrams of system components to efficiently execute linear algebra operations according to embodiments of the disclosure.
Figure 2B:
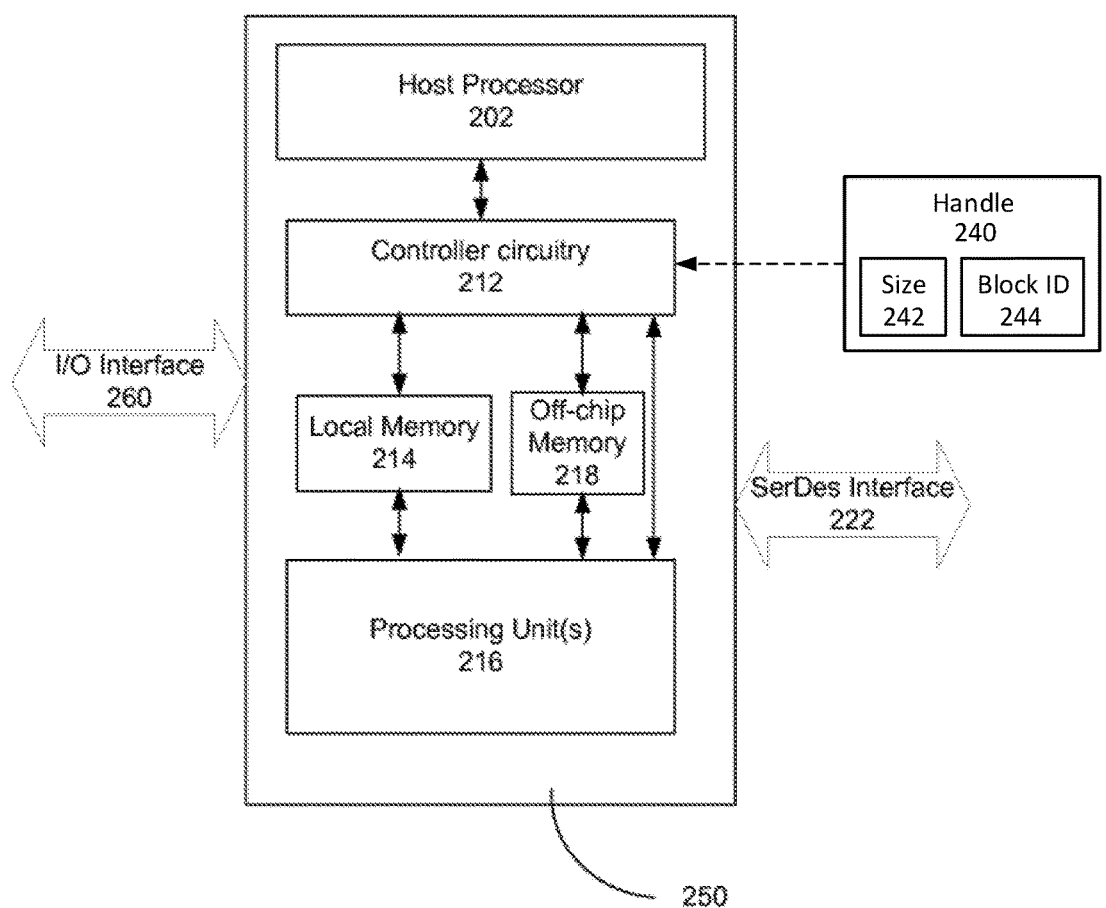

FIG. 2A-FIG. 2B are block diagrams of system components to efficiently execute linear algebra operations according to embodiments of the disclosure. In the embodiment illustrated in FIG. 2A, a system 200 is shown to include a peripheral apparatus 210 including a controller circuitry 212, a local memory 214 (alternatively referred to herein as "on-chip" memory), off-chip memory 218 (comprising any combination of non-volatile and volatile memory), and one or more processing units 216. The peripheral apparatus 210 is shown to be communicatively coupled to host system components including a host processor 202 and a host memory 204. The host memory 204 can comprise any combination of non-volatile and volatile memory, such as cache memory of the host processor 202, random access memory (RAM) such as synchronous RAM (SRAM), dynamic RAM (DRAM), etc. The peripheral apparatus 210 is further shown to include one or more serializer/deserializer (SerDes) interfaces 222 for coupling to one or more additional peripheral apparatuses as described in further detail below.

The peripheral apparatus 210 can be communicatively coupled to various host components including the host processor 202 and the host memory 204 via an interconnect bus 220, and can communicate via any known interconnection protocol (e.g., a Peripheral Component Interconnect express (PCIe) protocol, a Small Computer Systems Interface (SCSI) protocol, a Fibre Channel (FC) protocol, a Serial Attached SCSI (SAS) protocol, a Universal Serial Bus (USB) protocol, etc.). In other embodiments, the components of the peripheral apparatus 210 can comprise components integrated with the host device or the functionality of the components of the peripheral device can be executed via components of the host device, such that the utilization of the interconnect bus 220 is not necessary. FIG. 2B illustrates an alternate configuration, wherein the host processor 202, the controller circuitry 212, the local memory 214, the off-chip memory 218, the processing unit(s) 216, and the one or more SerDes interfaces 222 are included in a self-hosting device 250. The device 250 may be communicatively coupled to another computing device or system via an I/O interface 260 (using any known I/O protocol, such as Ethernet, USB, etc.).

In this embodiment, the controller circuitry 212 is to receive the matrix operation 100 (of FIG. 1), and load each of the operands 110 and 120 into system memory; depending on the size of the operands 110 and 120, the controller circuitry 212 can load this data solely into the local memory 214, or a combination of the local memory 214 and the off-chip memory 218. As described in further detail below, as the operands 110 and 120 comprise 2D matrices, they are loaded into (one or more) 2D blocks of the system memory. Regardless of the combination of off-chip/on-chip memory elements used, each of the operands 110 and 120 are accessible via a signal memory handle associated with the 2D blocks of memory that include each respective matrices' elements.

As referred to herein, a memory handle describes an identifier for each of the operands 110 and 120 as well as the output of the matrix multiply operation 100. As discussed above, each of the operands 110 and 120 as well as the output of the matrix multiply operation 100 can be stored in any combination of the on-chip memory 214 and the off-chip memory 218; a memory handle (e.g., 240) encapsulates the location (e.g., 244) of the respective data (i.e., on-chip and/or off-chip) and its dimensions (e.g., 242). Each of the operands 110 and 120 and the output of the matrix multiply operation 100 can comprise any size/dimensions capable of being stored in any (available) combination of the on-chip memory 214 and the off-chip memory 218 in order to be accessible via a single memory handle.

The controller circuitry 212 can receive the matrix multiply operation 100 along with the memory handles (e.g., 240) associated with the operands 110 and 120. The controller circuitry 212 can determine how to distribute (i.e., tile) the matrix multiply operation 100 across the one or more processing units 216 and how to organize the data of the operands 110 and 120 within the on-chip memory 214.

Thus, the processing units 216 can be used to (collectively) execute the matrix operation 100 by accessing each of the matrix operands 110 and 120 via their respective single memory handle, thereby eliminating significant overhead in memory allocation, data tracking, and subroutine complexity present in prior art solutions. The result of the matrix operation 100 is also stored in the system memory (i.e., the local memory 214 and/or the off-chip memory 218), and is also accessible via a single memory handle identifying the matrix elements of the result.

Furthermore, in some embodiments, multiple peripheral devices can be used to collectively execute any of the operations described herein. Both of the peripheral devices 210 and 250 are shown to include one or more SerDes interfaces 222 for communicatively coupling to other similarly configured peripheral devices. The SerDes interface(s) 222 may comprise any interface including logic and/or modules to, at the transmitting side, convert parallel data to high-speed serial data for transmitting, and at the receiving side, convert received high-speed serial data to parallel data. Multiple peripheral devices can be coupled in 2D interconnect array, a larger multi-dimensional array (i.e., n-dimensional array), etc., for executing any of the operations described herein.

Other embodiments may utilize any inter-chip communication means other than the SerDes interfaces 222 described above. Any other serial inter-chip interface, parallel inter-chip interface, optical inter-chip interface, etc. may be used to interconnect multiple peripheral devices in other embodiments. Furthermore, in some embodiments, rather than multiple peripheral devices, multiple instances of the components of the peripheral devices 210, 250, and/or 270 may be included in a single integrated circuit (e.g., chip); these instances may be communicatively coupled via a serial or parallel bus.

Figure 2C:
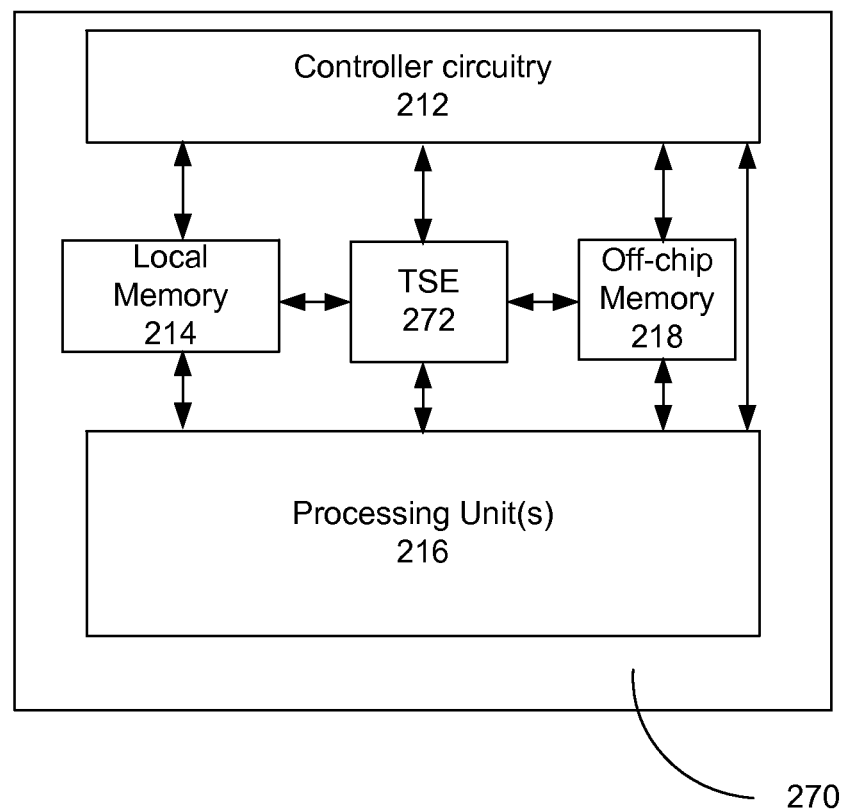

In some embodiments, additional logic/modules can be used to control the distribution of operand data to the processing unit(s) 216. FIG. 2C illustrates a peripheral apparatus 270, which is shown to include a tensor slicing engine 272 communicatively coupled to the control circuitry 212, the processing unit(s) 216, the local memory 214, and the off-chip memory 218 discussed above (in other embodiments, self-hosting devices similar to the device 250 of FIG. 2B can also utilize the tensor slicing engine 272). In this embodiment, the tensor slicing engine 272 can be used to perform operations to slice a tensor (i.e., a multi-dimensional array of data) into sub-arrays (having a number of dimensions less than or equal to the tensor) for the processing unit(s) 216 to receive as an input when executing an operation. The slicing includes and is not limited to simple access patterns such as different strides along different dimensions as well as more complex access patterns than enable performing efficient convolutional operations using matrix multiplies.

FIG. 3A illustrates partitioning matrix operand elements to a plurality of sub-matrices according to an embodiment of the disclosure. For large matrix operands, each operand can be partitioned (i.e., tiled) into sub-matrices. The size and the dimensions of these sub-matrices can be selected based on hardware attributes (described in further detail below). In this embodiment, the matrix operand 110 is shown to be partitioned into a plurality of sub-matrices A1-A9, and the matrix operand 120 is shown to be partitioned into a plurality of sub-matrices B1-B9. In this example, each of the sub-matrices A1-A9 comprises n×m matrices (embodiments can utilize square or non-square partitions) and each of the sub-matrices B1-B9 comprises m×n matrices.

The size and the dimensions of the sub-matrices A1-A9 and B1-B9 can be selected based on hardware attributes of the processing unit(s) 216 of FIG. 2A-B. In some embodiments each of the processing unit(s) 216 can receive, as an input, (sub)matrix operands up to a size of n×m/m×n (square or rectangular) when executing a single operation. Thus, because the matrix operands 110 and 120 exceed this size, they are partitioned into the sub-matrices A1-A9 and B1-B9. As discussed above, in some embodiments the controller circuitry 212 executes this partitioning so that the matrix operation 100 comprises a single user-level instruction. Furthermore, in other embodiments utilizing an operation other than a matrix multiplication operation, the above described sub-matrices can have different row/column attribute requirements.

The result of the matrix operation 100 can be expressed as sub-operations, in this example a simpler matrix-matrix multiplication of the matrices 310 (including sub-matrices A1-A9) and 320 (including sub-matrices B1-B9). A representation of the result of the matrix operation 100 is illustrated in FIG. 3B as a matrix 330 including matrix elements C1-C9, shown in this figures to be the result of the multiplication of matrix elements A1-A9 and B1-B9.

Figure 3C:
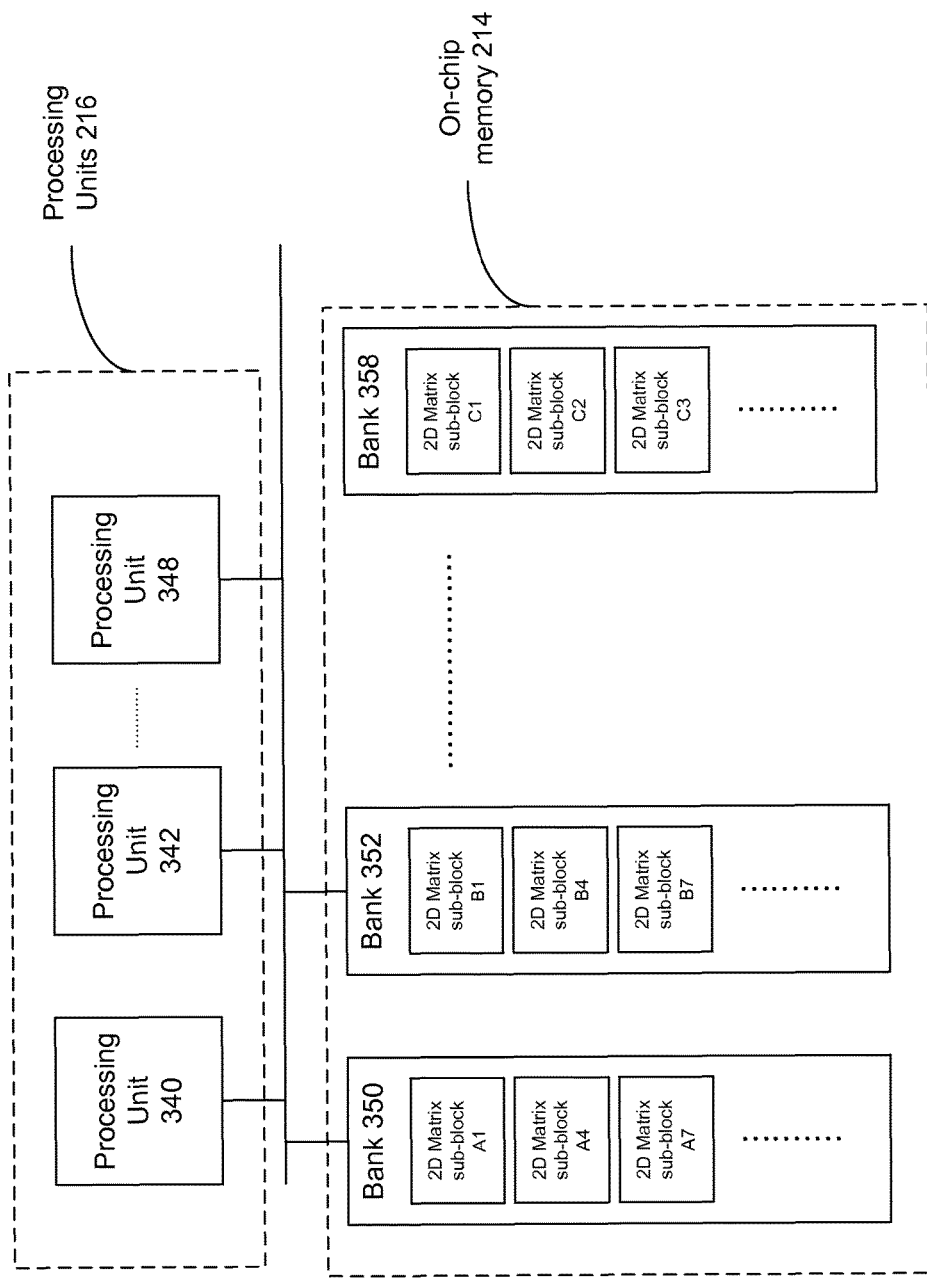
FIG. 3C illustrates a configuration of processing units and system memory to execute a matrix operation according to an embodiment of the disclosure.

FIG. 3C illustrates a configuration of processing units and system memory to execute a matrix operation according to an embodiment of the disclosure. In this embodiment, processing units 216 of the peripheral devices 210/250 illustrated in FIG. 2A-B are shown to comprise a plurality of processing units 340-348 used to execute the matrix instruction 100 for multiplying the matrix operand 110 to the matrix operand 120; as discussed above the operands 110 and 120 can be partitioned into sub-matrices A1-A9 and B1-B9, respectively (illustrated as operands 310 and 320 of FIG. 3A). In other words, the matrix multiplication (sub)-operations illustrated in FIG. 3B (i.e., the matrix-matrix multiplication operations) are collectively executed by the processing units 340-348, wherein each processing unit can be used to execute one of the (sub) matrix-matrix multiply operations.

The controller circuity 212 of the peripheral apparatuses 210/250 of FIG. 2A-B can receive data identifying the multiply instruction 100 and memory handles associated with the operands 110 and 120; as discussed above, said memory handles can identify the dimensions of the operands 110 and 120. The division of tasks related to multiplying the sub-matrices A1-A9 and B1-B9 (whose dimensions can be set to a default value) can be done by the controller circuitry 212, controller circuity specifically assigned to the processing units 340-348, etc.; however, the processing units 340-348 can simply receive the relevant sub-matrix data, and thus, there is no need to create different memory handles (i.e., identifiers) for each of the sub-matrices A1-A9 and B1-B9.

The on-chip memory 214 of FIG. 2A-B is illustrated in this example as a plurality of register banks 350-358. At least some of the sub-matrices A1-A9, B1-B9 and C1-C9 are shown to be distributed amongst the register banks 350-358. As discussed above, for matrix operands comprising a large number of elements, the data for the operands 110 and 120 can be loaded into a combination of on-chip and off-chip memory, depending on the parameters of the operation being executed. In some embodiments, the controller circuity 212 controls the transfer of data between on-chip and off-chip memory.

In some embodiments, a processing unit can execute one "read" from one of the register banks 350-358 during an execution of a single operation (other embodiments may execute multiple reads from the register banks on execution of a single operation). For example, the processing unit 340 can execute operations related to the (sub)matrix-matrix multiply operation A1*B1 in parallel with the other processing units. To allow the processing unit 340 to access the relevant row/column data of the sub-matrices A1 and B1 during the same clock cycle, A1 is shown to be included in the bank 350, while B1 is shown to be included in the bank 352; the other sub-matrices used in the remaining (sub) matrix-matrix multiply operations of FIG. 3B can be distributed across different register banks in a similar manner such that each of the processing units 340-348 can access relevant sub-matrix data on every clock cycle to execute operations in parallel. Furthermore, the results of these matrix-matrix multiply operations can also be distributed across different register banks in a similar manner so that their summation can be executed in parallel by the processing units 340-348.

In some embodiments, each of the processing units 340-348 can execute a matrix-matrix multiplication operation with a stored partial product; this partial product can either be an output of a processing unit or can be stored within the executing processing unit (e.g., to be added to the result of a future matrix multiply). Furthermore, each of the processing units 340-348 can generate more than one output operand for storage or forwarding to other processing units (e.g., linear algebra outputs used in a function's domain).

Figure 4:
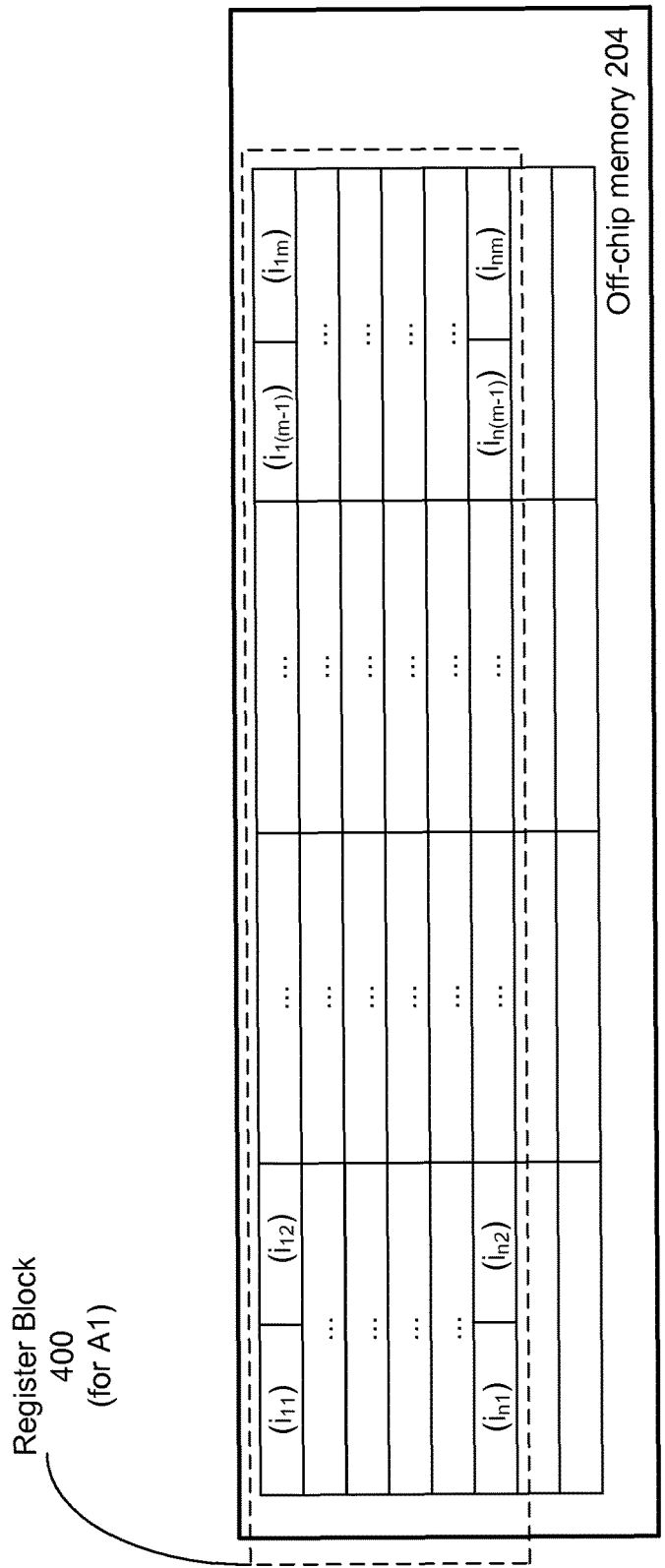
FIG. 4 is an illustration of a distribution of matrix elements according to an embodiment of the disclosure.

As discussed above, an operand can be included in a combination of on-chip or off-chip memory. FIG. 4 is an illustration of a distribution of matrix elements in memory other than the on-chip memory 214 of FIG. 2A-B according to an embodiment of the disclosure. In this embodiment, some of the row data for the sub-matrix A1 is distributed horizontally across a row of memory registers 400. Each utilized register includes more than one column element of the sub-matrix A1. This configuration can be used, for example, when the controller circuitry 212 of FIG. 2A-B determines the elements of a matrix operand comprise (relatively) low bit-width integer, floating point, or fixed-point elements, and thus having more than one matrix element in a single register can allow for maximizing memory bandwidth when this data for sub-matrix A1 is subsequently loaded onto the on-chip memory 214.

Figure 5:
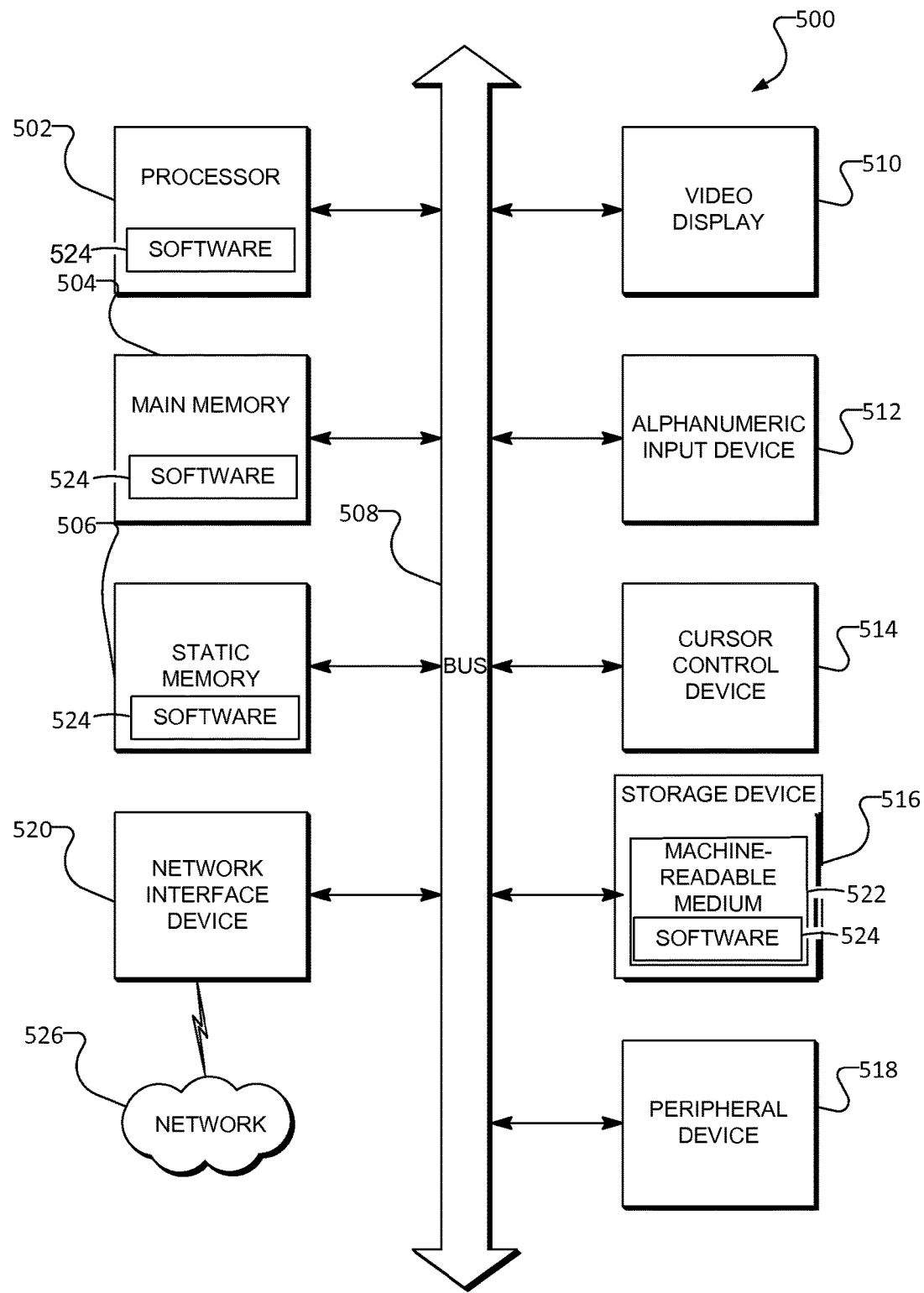
FIG. 5 is a block diagram illustrating components of a computer system according to aspects of the disclosure.

FIG. 5 is a block diagram illustrating components of a computer system according to aspects of the disclosure. In particular, FIG. 5 illustrates an exemplary computer system 500 within which software 524 can cause the machine including the illustrated components of the system 500 to perform any one or more processes that can utilize linear algebra routines, operations, and operands discussed herein. In alternative embodiments, the machine operates as a standalone device or can be communicatively coupled to other machines (e.g., via a network connection). In a networked deployment, the machine can operate in the capacity of a server or a client machine in a server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 500 includes at least one processor/processor core 502 (e.g., a CPU, CPU or both), a main memory 504 and a static memory 506, which communicate with each other via a bus 508. The computer system 500 can further include a video display unit 510 (e.g., a LCD or a cathode ray tube (CRT)). The computer system 500 also includes an alphanumeric input device 512 (e.g., a keyboard), a user interface navigation (or cursor control)

device 514 (e.g., a mouse), a storage device 516, a peripheral device 518 (e.g., the peripheral devices 210/250 of FIG. 2A-B), and a network interface device 520.

The storage device 516 includes a non-transitory machine-readable medium 522 on which is stored one or more sets of data structures and software 524 embodying or utilized by any one or more of the methodologies or functions described herein. The software 524 can also reside, completely or at least partially, within the main memory 504 and/or within the processor 502 during execution thereof by the computer system 500, with the main memory 504 and the processor 502 also constituting non-transitory, machine-readable media 522. The software 524 can also reside, completely or at least partially, within the static memory 506.

While the non-transitory machine-readable medium 522 is shown in an example embodiment to be a single medium, the term "machine-readable medium" can include a single medium or multiple media (e.g., a centralized or distributed database, and/or associated caches and servers) that store the one or more software 524 or data structures. The term "machine-readable medium" shall also be taken to include any tangible medium that is capable of storing, encoding, or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media 522 include non-volatile memory, including by way of example semiconductor memory devices (e.g., erasable programmable read-only Memory (EPROM), electrically erasable programmable read-only memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Figure 6A:
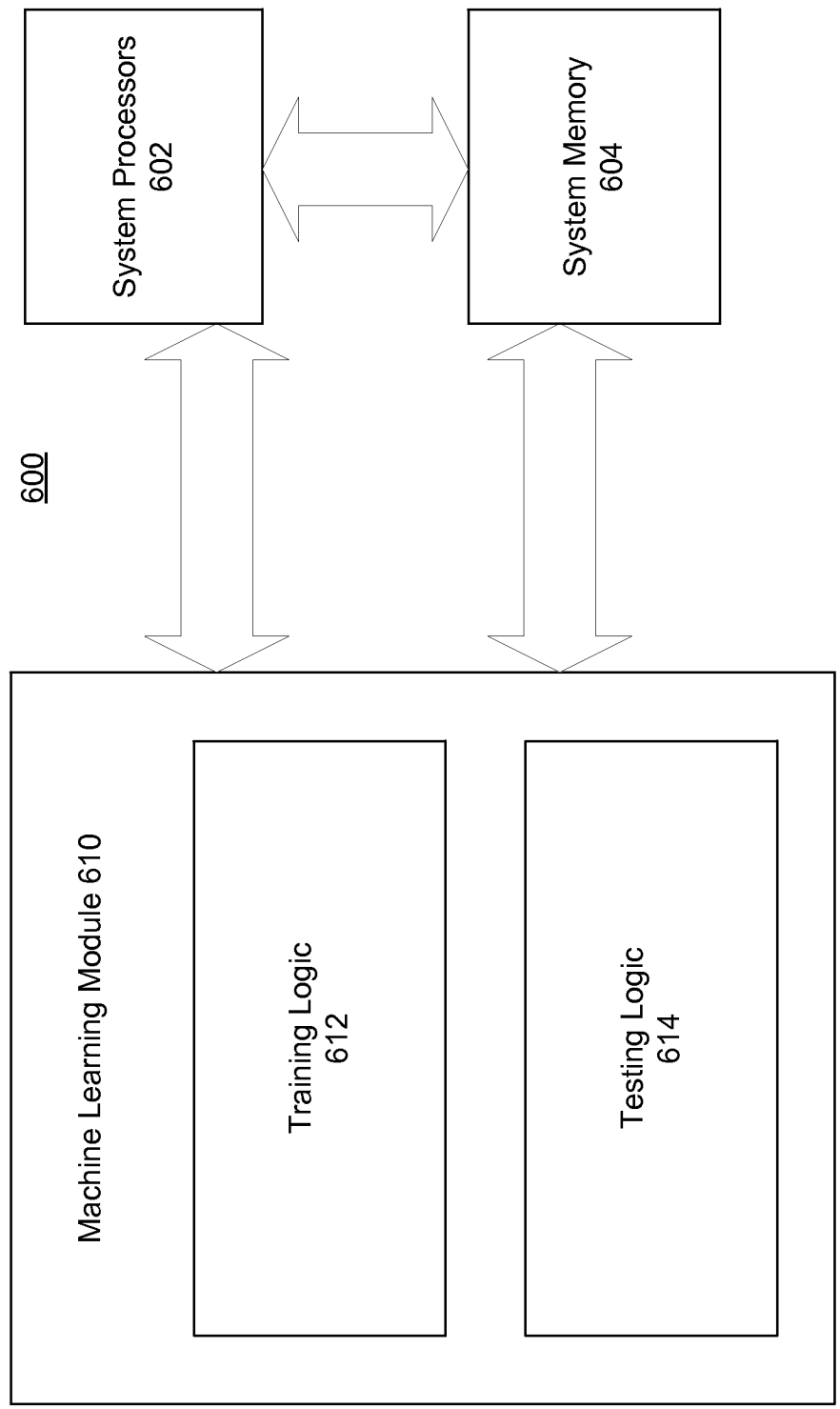
FIG. 6A-FIG. 6B are illustrations of system components for executing a machine learning module according to an embodiment of the disclosure.
Figure 6B:
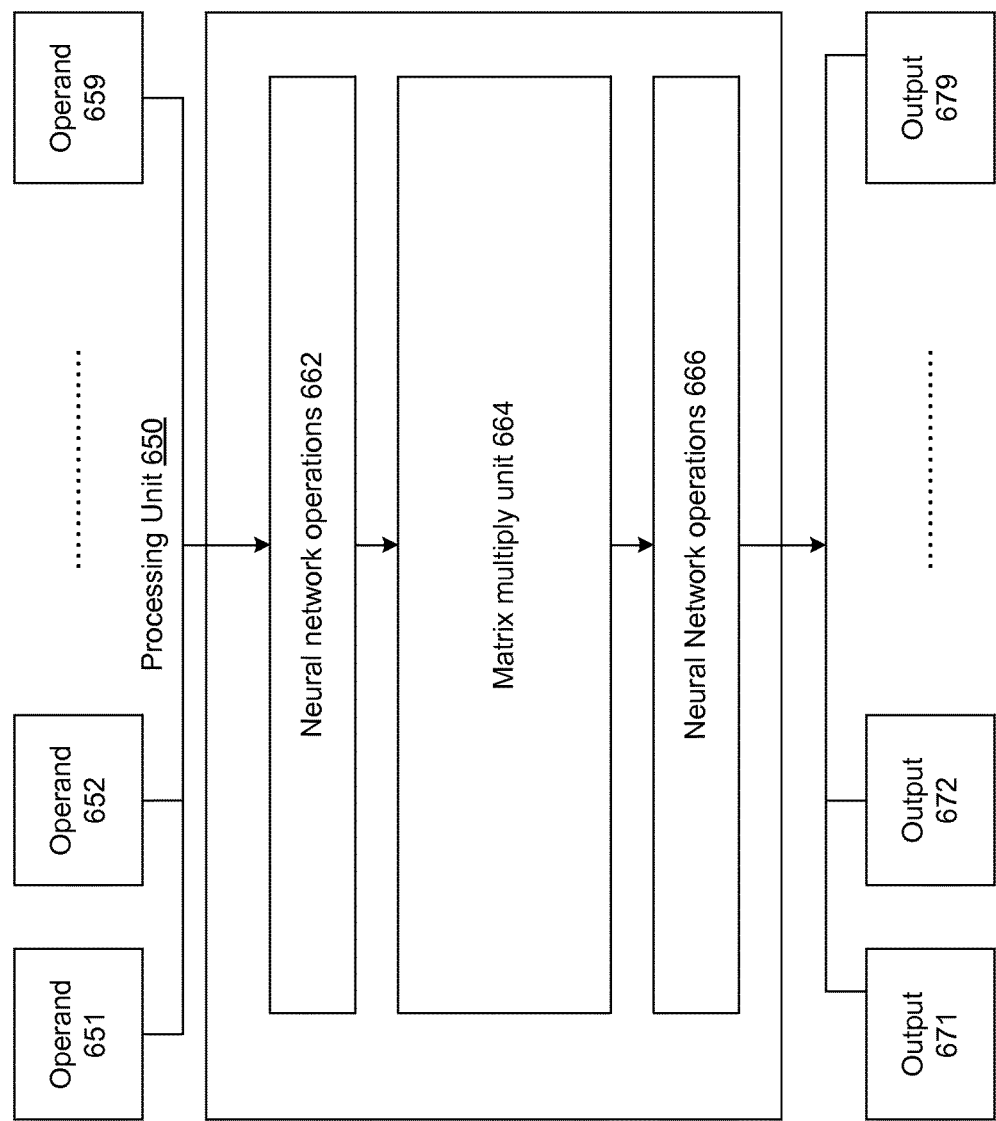

FIG. 6A-FIG. 6B are illustrations of system components for executing a machine learning module according to an embodiment of the disclosure. In this embodiment, system 600 as shown in FIG. 6A includes a machine learning module 610 executed via one or more system processors 602 and a system memory 604. The machine learning module 610 can comprise any module to execute a machine learning process and can be included in a machine learning model (e.g., a neural network). The machine learning module 610 is shown to include a training module 612 and a testing module 614 (as referred to herein, any software "module" can be implemented as hardware logic or circuitry). The training module 612 is executed for computations wherein parameters of a machine learning algorithm are adjusted using training data. The testing module 614 is executed for computing runtime information as a function of input data and data from the training module 612. These operations of the training module 612 and the testing module 614 can comprise any of a matrix-matrix element-wise operation (e.g., common operations such as +, *, /, <, >, =, etc.), a matrix-matrix multiply operation—including a matrix-matrix multiply operation with a (processor stored) partial product as described above, compound operations such as one or more matrix-matrix multiply operations further applied to one or more element-wise operations, a random sampling operation, etc.

FIG. 6B illustrates one of the system processors 602 according to an embodiment. Neural networks (in addition to other machine learning systems) often execute complex mathematic operations that include linear algebra operations combined with other operations. In neural networks, linear algebra operations can be preceded or followed by other operations including non-linearities, random sampling operations, pooling operations, subsampling operations, and normalization operations depending on the particular neural network algorithm. Each class of operations comprises a number of possibilities. Non-linearities can include sigmoid units, rectified linear units, 'max-out' units, etc. Random sampling operations can include sampling from a family of probability distributions and can comprise Bernoulli (or binary) and Gaussian distributions, etc. Pooling operations can include operations on tiled subsets of the output of the linear algebra operations and can comprise max pooling and average pooling. Subsampling operations can take a strided subset of the output of the linear algebra operations. Normalization operations can include taking the output of linear algebra operations or series of operations and performing a normalization operation across all these outputs. These operations can include divisive or subtractive normalization, cross-map normalization, softmax operations, etc.

A processing unit 650 is shown to include logic 662 and 666 for executing neural network operations and matrix multiply unit 664 for executing matrix multiply operations, such that the processing unit 650 can execute any combination of linear algebra operations and other operations (i.e., generate one or more outputs 671-679 based on the operands 651-659). The processing unit 650 can execute a large number of these operations, and thus can utilize any of the embodiments directed towards matrix operands for linear algebra operations discussed above.

In the foregoing detailed description, the method and apparatus of the present subject matter have been described with reference to specific exemplary embodiments thereof. It will, however, be evident that various modifications and changes can be made thereto without departing from the broader spirit and scope of the present disclosed subject matter. The present specification and figures are accordingly to be regarded as illustrative rather than restrictive.

Embodiments describe an apparatus comprising a memory, and one or more integrated circuits (ICs) communicatively coupled to the memory. The one or more ICs comprise controller circuity to receive a matrix operation, the matrix operation to identify a plurality of matrix operands, at least some of the matrix operands comprising at least two-dimensional (2D) matrix operands and including a set of matrix elements arranged in at least row and column directions, and load the matrix elements for the plurality of matrix operands onto the memory, wherein each of the 2D matrix operands are to be loaded into one or more blocks of the memory comprising at least 2D blocks of memory, and wherein each of the matrix operands are to be accessible via a single memory handle identifying dimensions of the matrix operands and the block(s) of the memory including each operand's set of matrix elements. The one or more ICs further comprise one or more processing units to execute the matrix operation by accessing each of the matrix operands via the respective single memory handle associated with each operand and output a result of the matrix operation as a matrix operand to be stored in the memory.

In some embodiments, the memory comprises both on-chip and off-chip memory. In some embodiments, the result of the matrix operation comprises a matrix operand comprising at least a 2D matrix operand to be stored into one or more blocks of the memory comprising at least a 2D block of memory and accessible via a single memory handle.

In some embodiments, the memory comprises at least on-chip register banks, and wherein the controller circuitry is to load matrix the matrix elements for the plurality of matrix operands onto the memory by distributing at least some of the matrix elements of each of the matrix operands into one or more register banks In some embodiments, at least one of the matrix operands is to be partitioned into a plurality of sub-matrices, each sub-matrix to be stored in a block of registers that are included in a single register bank. In some embodiments, the one or more processing units comprise a plurality of processing units to execute sub-operations of the matrix operation. In some embodiments, distributing data of each of the 2D matrix operands into one or more register banks includes distributing data of each of the matrix operands used in one or more sub-operations of the matrix operation executed via the plurality of processing units to different register banks such that the plurality of processing units are to perform the sub-operations in parallel. In some embodiments, at least some of the sub-matrices of one of the matrix operands are stored in a same register bank.

In some embodiments, when loading matrix data for the plurality of matrix operands onto the off-chip memory, the controller circuitry is to distribute two or more matrix elements into a single memory register of the off-chip memory. In some embodiments, the matrix operation comprises a matrix-matrix multiply operation. In some embodiments, at least one of the 2D matrix operands is to be partitioned into a plurality of sub-matrices, and wherein at least one processing unit is to retrieve a partial product, the partial product comprising a result of a matrix-matrix multiply operation for a first and a second sub-matrix, receive data of a third and a fourth sub-matrix, and generate a result comprising an addition of the partial product to a multiplication of the third sub-matrix and the fourth sub-matrix. In some embodiments, the at least one processing unit is to store the partial product in a memory of the processing unit.

In some embodiments, the matrix operation comprises an element-wise matrix operation. In some embodiments, the matrix operation comprises a combination of at least a matrix-matrix multiply operation and the element-wise matrix operation. In some embodiments, at least one processing unit is to output a plurality of output operands from executing one or more sub-operations of the matrix operation.

In some embodiments, the matrix operation comprises at least one of a non-linearities operation, a random sampling operation, a pooling operation, a subsampling operation, and/or a normalization operation. In some embodiments, the one or more ICs comprise an application specific integrated circuit (ASIC) including the controller circuitry and the one or more processing units. In some embodiments, the one or more ICs further include a tensor slicing engine to slice the 2D matrix operands into sub-matrices, the sub-matrices to be received by the one or more processing units when executing the matrix operation.

Embodiments described a system comprising a host processor, a host memory, an input/output (I/O) interface, a memory separate from the host memory, and one or more integrated circuits (ICs) communicatively coupled to the memory. The one or more ICs comprise controller circuitry to receive a matrix operation, the matrix operation to identify a plurality of matrix operands, at least some of the matrix operands comprising at least two-dimensional (2D) matrix operands and including a set of matrix elements arranged in row and column directions, and load the matrix elements for the plurality of matrix operands onto the memory, wherein each of the 2D matrix operands are to be loaded into one or more blocks of the memory comprising at least 2D blocks of memory, and wherein each of the matrix operands are to be accessible via a single memory handle identifying dimensions of the matrix operands and the block(s) of the memory including each operand's set of matrix elements. The one or more ICs further comprise one or more processing units to execute the matrix operation by accessing each of the matrix operands via the respective single memory handle associated with each operand, and output a result of the matrix operation as a matrix operand to be stored in the memory.

In some embodiments, the memory comprises both on-chip and off-chip memory. In some embodiments, the I/O interface comprises an interconnect bus, and the memory separate from the host memory and the one or more ICs are included in a peripheral device communicatively coupled to the host processor and the host memory via the interconnect bus. In some embodiments, the host processor, the memory separate from the host memory, and the one or more ICs are included in a self-hosting device.

In some embodiments, the host processor is to further execute a neural network machine learning module. In some embodiments, the one or more processing units each include logic to execute neural network operations and a matrix multiply unit for executing the matrix operation.

In some embodiments, the one or more ICs are included in one of a plurality of peripheral apparatuses included in the system, and further comprise one or more inter-chip interfaces for coupling to one or more other peripheral apparatuses included in the system, wherein the peripheral apparatuses included in the system are interconnected in a multi-dimensional array.

The invention claimed is:

1. An apparatus comprising:
 a memory; and
 one or more integrated circuits (ICs) communicatively coupled to the memory and comprising:
  controller circuitry to:
   receive a matrix operation, the matrix operation to identify a plurality of matrix operands, at least some of the matrix operands comprising at least two-dimensional (2D) matrix operands and including a set of matrix elements arranged in at least row and column directions; and
   load the matrix elements for the plurality of matrix operands onto the memory, wherein each of the 2D matrix operands are to be loaded into one or more blocks of the memory comprising at least 2D blocks of memory, and wherein each of the matrix operands are to be accessible through use of a respective memory handle, each of the memory handles identifies corresponding dimensions of the matrix operand and the one or more corresponding blocks of the memory containing the set of matrix elements of the corresponding operand; and
  one or more processing units to:
   execute the matrix operation by accessing each of the matrix operands via the respective memory handle associated with each matrix operand; and
   output a result of the matrix operation as a matrix operand to be stored in the memory.

2. The apparatus of claim 1, wherein the memory comprises both on-chip and off-chip memory.

3. The apparatus of claim 2, wherein, when loading matrix data for the plurality of matrix operands onto the off-chip memory, the controller circuitry is to distribute two or more matrix elements into a single memory register of the off-chip memory.

4. The apparatus of claim 1, wherein the result of the matrix operation comprises a matrix operand comprising at least a 2D matrix operand to be stored into one or more blocks of the memory comprising at least a 2D block of memory and accessible via a single corresponding memory handle.

5. The apparatus of claim 1, wherein the memory comprises at least on-chip register banks, and wherein the controller circuitry is to load the matrix elements for the plurality of matrix operands onto the memory by distributing at least some of the matrix elements of each of the matrix operands into one or more register banks.

6. The apparatus of claim 5, wherein at least one of the matrix operands is to be partitioned into a plurality of sub-matrices, each sub-matrix to be stored in a block of registers that are included in a single register bank.

7. The apparatus of claim 6, wherein the one or more processing units comprise a plurality of processing units to execute sub-operations of the matrix operation.

8. The apparatus of claim 7, wherein distributing data of each of the 2D matrix operands into one or more register banks includes:
distributing data of each of the matrix operands used in one or more sub-operations of the matrix operation executed via the plurality of processing units to different register banks such that the plurality of processing units are to perform the sub-operations in parallel.

9. The apparatus of claim 8, wherein at least some of the sub-matrices of one of the matrix operands are stored in a same register bank.

10. The apparatus of claim 7, wherein at least one processing unit is to output a plurality of output operands from executing one or more sub-operations of the matrix operation.

11. The apparatus of claim 1, wherein the matrix operation comprises a matrix-matrix multiply operation.

12. The apparatus of claim 11, wherein at least one of the 2D matrix operands is to be partitioned into a plurality of sub-matrices, and wherein at least one processing unit is to:
retrieve a partial product, the partial product comprising a result of a matrix-matrix multiply operation for a first and a second sub-matrix;
receive data of a third and a fourth sub-matrix; and
generate a result comprising an addition of the partial product to a multiplication of the third sub-matrix and the fourth sub-matrix.

13. The apparatus of claim 11, wherein the at least one processing unit is to store the partial product in a memory of the processing unit.

14. The apparatus of claim 1, wherein the matrix operation comprises an element-wise matrix operation.

15. The apparatus of claim 14, wherein the matrix operation comprises a combination of at least a matrix-matrix multiply operation and the element-wise matrix operation.

16. The apparatus of claim 1, wherein the matrix operation comprises at least one of a non-linearities operation, a random sampling operation, a pooling operation, a subsampling operation, and/or a normalization operation.

17. The apparatus of claim 1, wherein the one or more ICs comprises an application specific integrated circuit (ASIC) including the controller circuitry and the one or more processing units.

18. The apparatus of claim 1, wherein the one or more ICs further include:
a tensor slicing engine to slice the 2D matrix operands into sub-matrices, the sub-matrices to be received by the one or more processing units when executing the matrix operation.

19. A system comprising:
a host processor;
a host memory;
an input/output (I/O) interface;
a memory separate from the host memory; and
one or more integrated circuits (ICs) communicatively coupled to the memory and comprising:
controller circuitry to:
receive a matrix operation, the matrix operation to identify a plurality of matrix operands, at least some of the matrix operands comprising at least two-dimensional (2D) matrix operands and including a set of matrix elements arranged in row and column directions; and
load the matrix elements for the plurality of matrix operands onto the memory, wherein each of the 2D matrix operands are to be loaded into one or more blocks of the memory comprising at least 2D blocks of memory, and wherein each of the matrix operands are to be accessible through use of a respective memory handle, each of the memory handles identifies corresponding dimensions of the matrix operand and the one or more corresponding blocks of the memory containing the set of matrix elements of the corresponding operand; and
one or more processing units to:
execute the matrix operation by accessing each of the matrix operands via the respective memory handle associated with each matrix operand; and
output a result of the matrix operation as a matrix operand to be stored in the memory.

20. The system of claim 19, wherein the memory comprises both on-chip and off-chip memory.

21. The system of claim 19, wherein the I/O interface comprises an interconnect bus, and the memory separate from the host memory and the one or more ICs are included in a peripheral device communicatively coupled to the host processor and the host memory via the interconnect bus.

22. The system of claim 19, wherein the host processor, the memory separate from the host memory, and the one or more ICs are included in a self-hosting device.

23. The system of claim 19, wherein the host processor is to further execute a neural network machine learning module.

24. The system of claim 23, wherein the one or more processing units each include logic to execute neural network operations and a matrix multiply unit for executing the matrix operation.

25. The system of claim 19, wherein the one or more ICs are included in one of a plurality of peripheral apparatuses included in the system, and further comprise:
one or more inter-chip interfaces for coupling to one or more other peripheral apparatuses included in the system;
wherein the peripheral apparatuses included in the system are interconnected in a multi-dimensional array.

* * * * *